Dec. 7, 1954  S. WAITZMAN  2,696,078
JET PROPULSION APPARATUS HAVING A COMBINATION
RAM-JET AND TURBOJET ENGINE
Filed Aug. 30, 1952  5 Sheets-Sheet 1
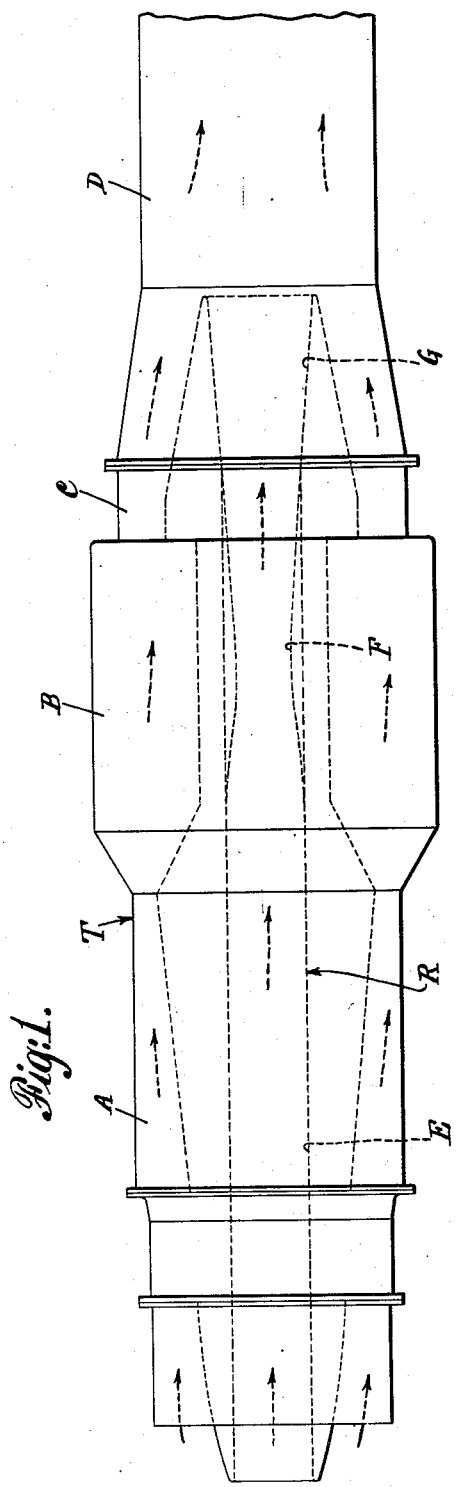
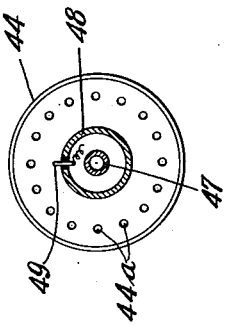
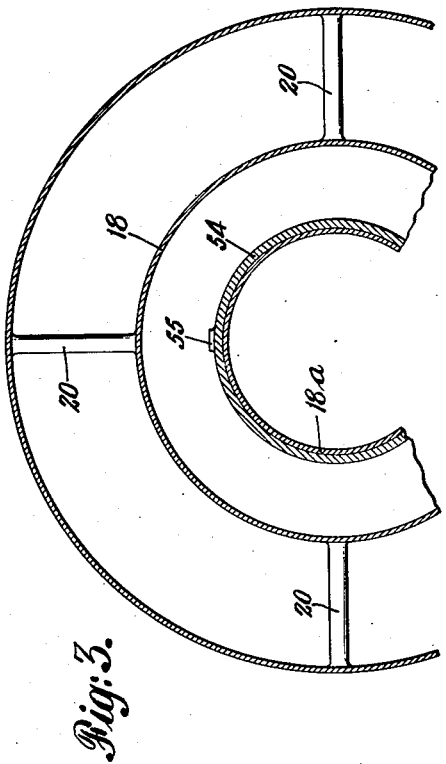
INVENTOR.
SIMON WAITZMAN
BY
Pollard and Johnston
ATTORNEYS

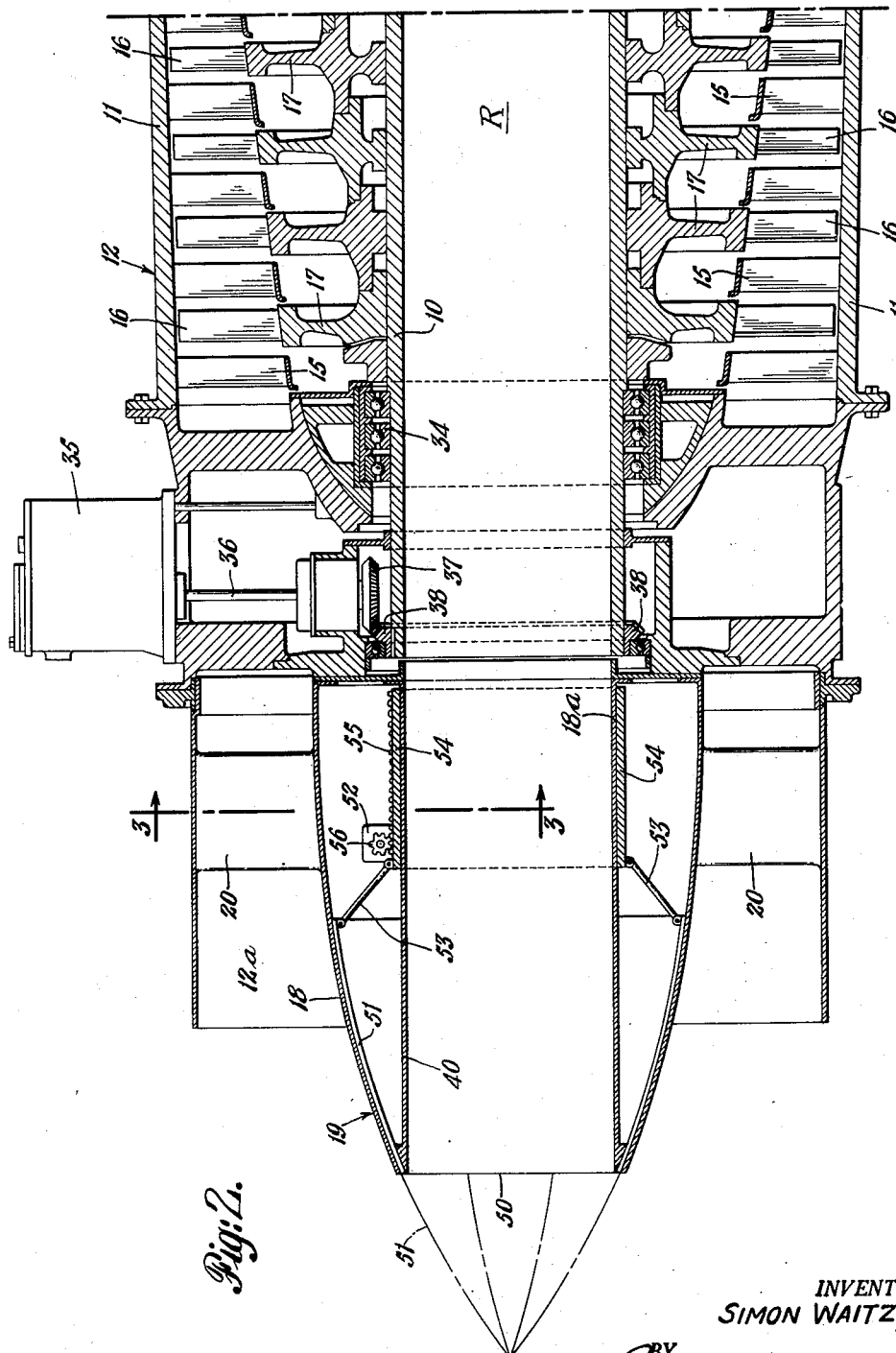

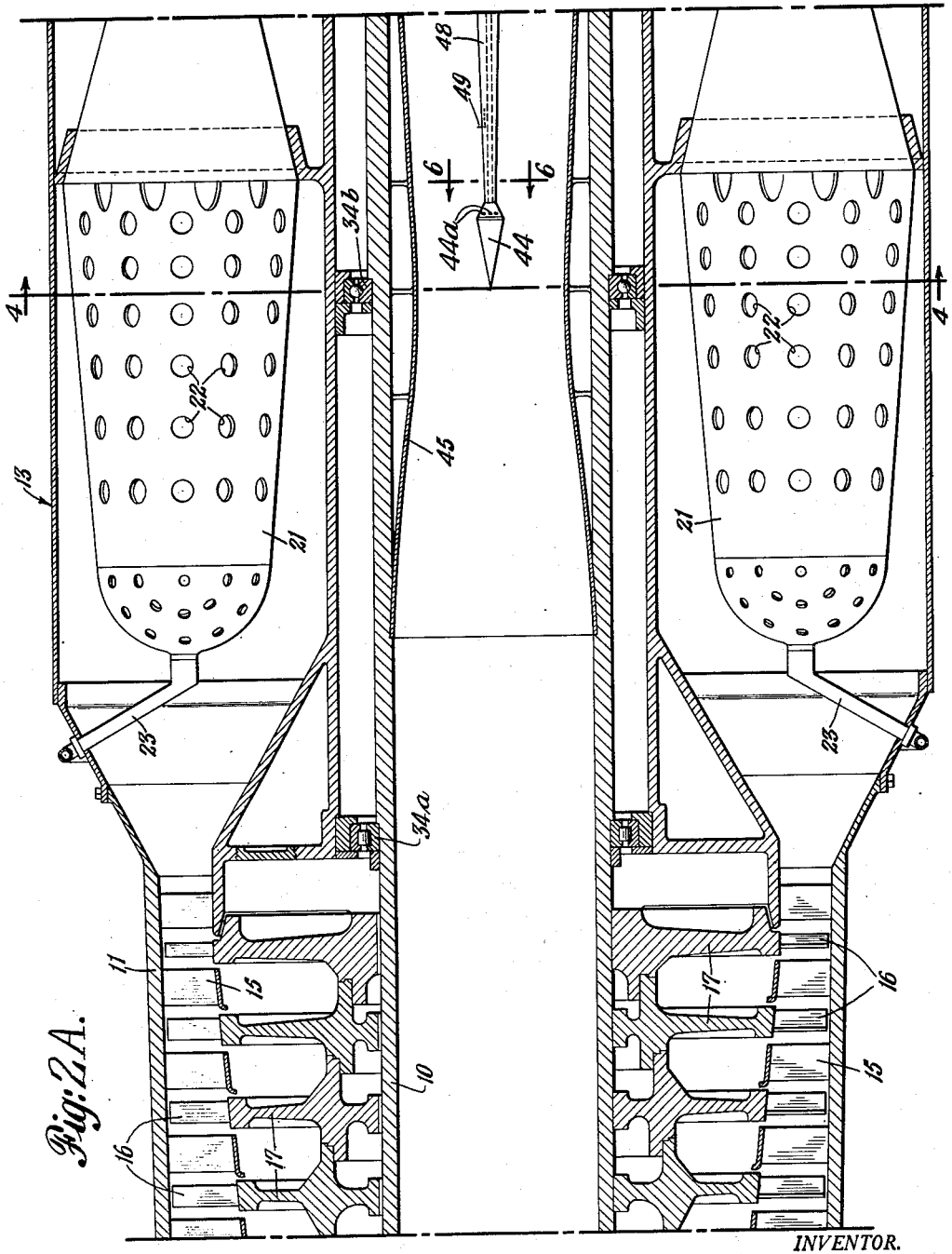

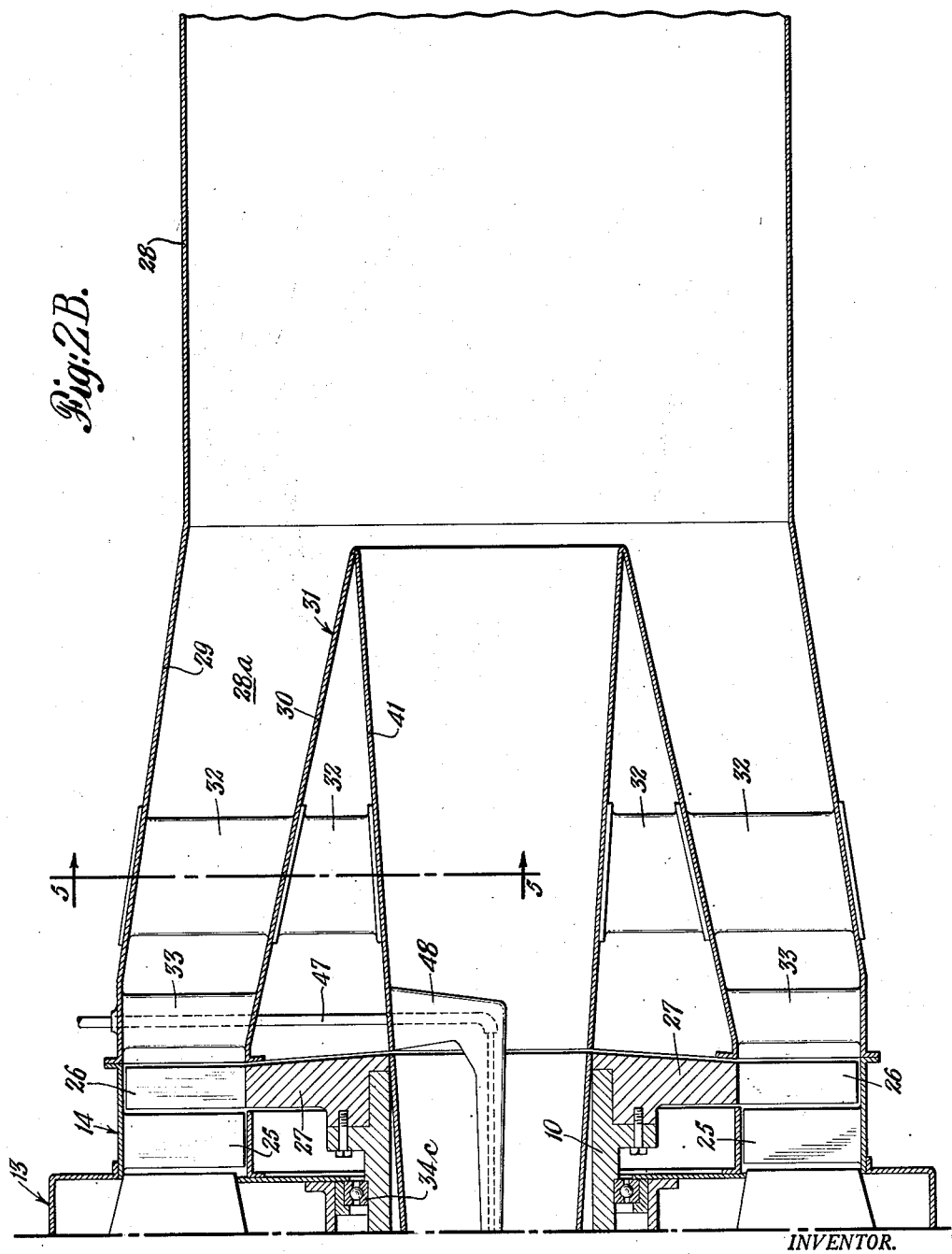

Dec. 7, 1954 S. WAITZMAN 2,696,078
JET PROPULSION APPARATUS HAVING A COMBINATION
RAM-JET AND TURBOJET ENGINE
Filed Aug. 30, 1952 5 Sheets-Sheet 5

INVENTOR.
SIMON WAITZMAN
BY
ATTORNEYS

United States Patent Office 2,696,078
Patented Dec. 7, 1954

2,696,078

JET PROPULSION APPARATUS HAVING A COMBINATION RAM-JET AND TURBOJET ENGINE

Simon Waitzman, Brooklyn, N. Y.

Application August 30, 1952, Serial No. 307,203

7 Claims. (Cl. 60—35.6)

This invention relates to new and improved jet propulsion power plants for aircraft and, more particularly, to such power plants of the ram-jet type.

Summary

A ram-jet engine or athodyd comprises essentially a continuous duct open at both ends and into the nose of which air at high velocities is continuously admitted, then heated, and then discharged rearwardly from the tail thereof at velocities greater than those of the incoming air. It is essential that air entering the ram-jet be at high velocities in order to cause sufficient compression for developing an effective thrust, and heretofore, it has been necessary to bring the ram-jet to very high speeds for efficient operation of the ram-jet.

According to my invention, the duct of a ram-jet engine is utilized as the rotatable shaft of a gas turbine jet propulsion engine and has its discharge end disposed in the discharge nozzle of the turbo-jet element so that the aspirating effect of the combustion gases discharged from the turbo-jet element and the forward speed of the aircraft, if any, may produce a sufficient suction to induce air into the ram-jet at velocities high enough to produce an effective compression for developing thrust in the ram-jet.

It is an object of my invention to provide conjoint action between operating members of a turbo-jet engine and members of a ram-jet engine. By my invention, the ram-jet engine is capable of operation irrespective of the speed of the aircraft. Furthermore, air normally employed as combustion air in the ram-jet may be used to cool the turbo-jet when the ram-jet is not in operation.

Other objects and advantages of my invention will appear as the description proceeds.

Description

Fig. 1 is a diagrammatic illustration of a preferred embodiment of my invention;

Figs. 2, 2A and 2B, when placed end to end from left to right in the order given, make up a vertical longitudinal section of the preferred embodiment of Fig. 1;

Fig. 3 is a fragmentary transverse cross-section taken along line 3—3 of Fig. 2;

Fig. 6 is an enlarged detail view of the fuel injector, taken along line 6—6 of Fig. 2A.

Figure 4:
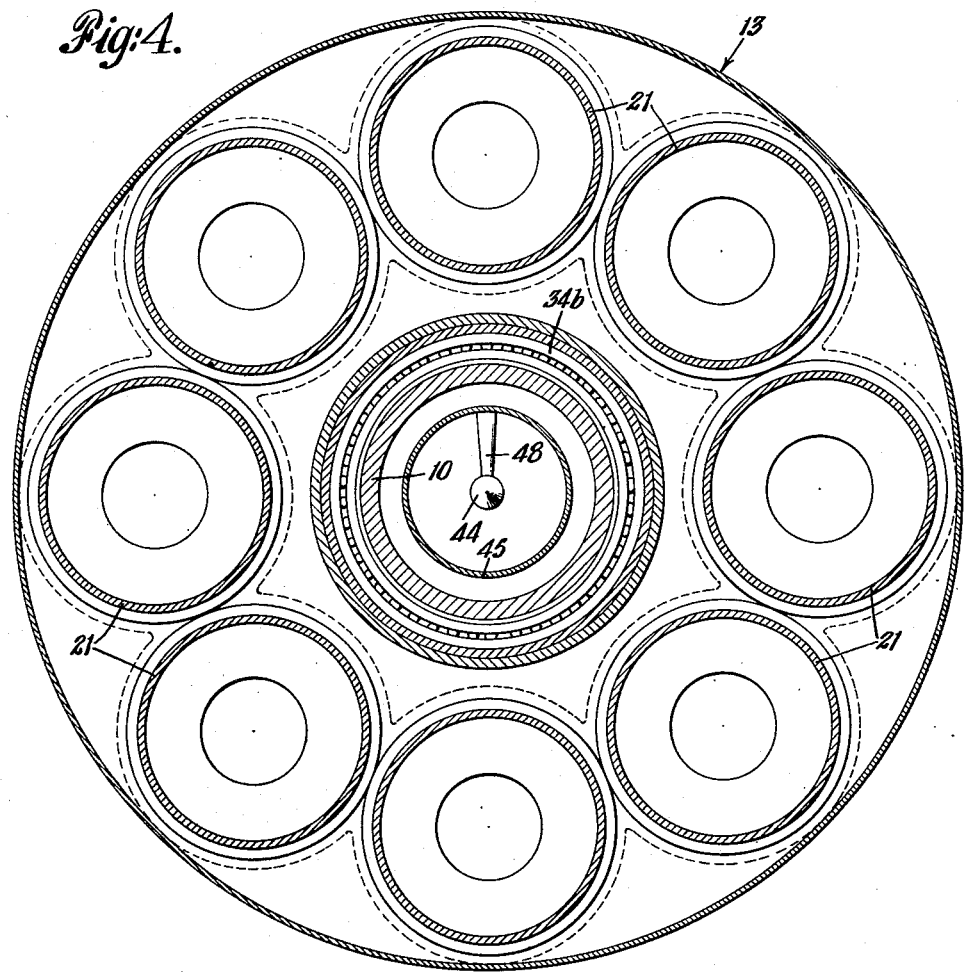
Fig. 4 is a transverse cross-section taken along line 4—4 of Fig. 2A.
Figure 5:
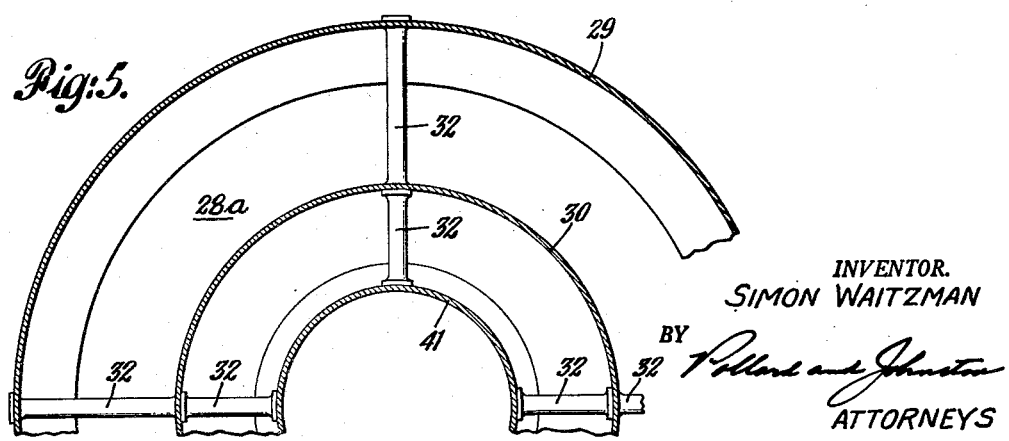
Fig. 5 is a fragmentary transverse cross-section taken along line 5—5 of Fig. 2B.

Fig. 1 of the drawings shows diagrammatically a ram-jet engine having a gas turbine jet propulsion element at T which forms an annular, axially extending flow path for motive fluid. The flow path includes a compressor section A, combustion section B, turbine section C, and exhaust nozzle section D in which the combustion gases are discharged from the turbine section at high velocities in the form of a jet. Arranged centrally within this annular flow path and forming the shaft of the gas turbine element is a ram-jet duct indicated generally at R forming a second flow path for motive fluid. The duct is normally open at both ends and includes a forward ram or diffuser section E, a combustion section F and a rear exhaust discharger section G which is concentric with, and terminates in, the exhaust nozzle section D of the gas turbine element so that combustion gases discharging from the gas turbine element produce an aspirating effect on the ram-jet duct, thereby inducing air at high velocities into the forward open end of the duct.

Referring now to the remaining figures of the drawing which show the detailed construction of the embodiment of Fig. 1, the jet power plant is formed about a central tubular member 10 which constitutes part of a ram-jet duct and which also constitutes the shaft of a turbo-jet element fitted annularly around the member 10.

The turbine element assembly comprises a generally cylindrical casing 11 enclosing an axial flow compressor 12, a plurality of circumferentially arranged combustion chambers 13, and a turbine 14 which drives the compressor 12. The gas turbine assembly may also have a centrifugal compressor or a combination of axial flow and centrifugal compressors. The compressor includes alternate annular rows of stator blades 15 fixed to the casing 11 and rotor blades 16 carried on rotor discs 17, the latter being fixed to the tubular shaft member 10 for rotation therewith. Air enters the compressor through an annular inlet 12a, the outer wall of which is formed by the casing 11 and the inner wall of which is formed by the outer surface 18 of a ring-shaped fairing 19 which is supported in the casing by struts 20. The air inlet receives air from scoops removed from the ram-jet inlet and disposed in wings of an aircraft for boundary layer control purposes.

Each of the combustion chambers 13 has a burner 21 with apertures 22 for admitting air discharged from the compressor into the burner. Fuel is injected into the burner from conduit 23 connected to a fuel tank (not shown), and the resultant combustion products are discharged into turbine 14. Initial ignition may be provided by a spark plug (also not shown). Fixed guide vanes 25 direct the combustion gases onto an annular row of blades 26 carried on rotor disc 27 fixed to tubular shaft member 10. The combustion gases, after giving up part of the energy to the turbine, are discharged to the atmosphere through a jet nozzle 28. The forward portion of the nozzle 28 is an annular duct 28a having an outer wall 29 which is part of casing 11 and an inner wall 30 which is part of a ring-shaped fairing 31 supported in the casing by struts 32. Fixed hollow guide vanes 33 are disposed in this annular duct to straighten out the combustion gases in the nozzle 28. The tubular shaft member 10 is mounted in bearings 34, 34a, 34b, and 34c, supported in the casing structure, and drives accessories indicated generally at 35 by a shaft 36 connected to the shaft 10 by bevel gears 37 and 38.

The ram-jet assembly R comprises a segmental tubular duct extending axially through the turbo-jet assembly and including a fixed forward segment 40 formed by the inner wall of fairing 19, a fixed rear segment 41 formed by the inner wall of fairing 31, and an intermediate rotatable segment formed by tubular member 10. The duct 40—10—41 includes a forward ram or diffuser section where the velocity of incoming air is converted to pressure; an intermediate combustion section including a fuel injector 44 having apertures 44a (Figs. 2A and 6) and a venturi element 45 for converting pressure to velocity; and a rear discharge section forming a continuation of the venturi element 45 and terminating within the jet nozzle 28 of the turbine element so that combustion gases escaping to the atmosphere from the turbine 24 will produce a suction in the ram-jet duct to induce air at high velocities into the duct.

Fuel is supplied from a fuel tank (not shown) to fuel injector 44 having apertures 44a by a pipe 47 extending through hollow guide vane 33, fairing 31 and an angular bracket 48 fixed to fairing 31 and supporting fuel injector 44. A spark plug 49 is also supported in the bracket and is utilized for initial ignition of the fuel; it is connected by leads (not shown) to a suitable source of electrical energy.

The air inlet 50 of the ram-jet duct is normally open, but may be closed by retractable tulip covers 51 when the ram-jet is not in operation. The covers 51 are movable to and from a position closing the duct by an auxiliary electric motor 52 which is selectively energized and de-energized by controls (not shown) accessible to the pilot. The motor actuates covers 51 by a horizontally reciprocable ring 54 connected with the covers by links 53 and with the motor by rack 55 and pinion 56. The exhaust of the ram-jet duct may also be closed in a similar manner. The air inlet of the compressor of the turbo-jet is normally open but may be closed when the turbo-jet element is not in operation so as to prevent free wheeling of the compressor which would result in a drag on the aircraft. To this end, a closure member, such as retractable tulip cover members or guide vanes rotatable on their axis, may be positioned in the air inlet at any suitable location.

Operation will first be considered with regard to the turbo-jet which is started when the aircraft is at rest, and which must be started before the ram-jet can be operated. Air entering the compressor 12 through ducts 12a, is compressed by the action of stator blades 15 and rotor blades 16, and is then passed in a compressed state to combustion chambers 13 where fuel is injected into the air and is burned. The resultant combustion products are directed onto turbine blades 26 by guide vanes 24 so as to rotate the turbine for driving compressor 12. After giving up part of their energy to the turbine, the gases are discharged to the atmosphere through jet nozzle 28 wherein the pressure of the gases is reduced and the velocity is correspondingly increased so that the gases leave the nozzle at supersonic velocities. The resulting reaction forces provide a forward thrust for propelling the aircraft.

Having regard now to operation of the ram-jet, the supersonic speed of the gases leaving the turbo-jet plus the forward speed of the aircraft, if any, will aspirate air from the ram-jet duct and produce a suction therein which, if the air inlet 50 is open, may induce air into the front of the ram-jet at velocities sufficient to effect a ram-compression of the air in the diffuser section of the duct. Such compression will be great enough for developing thrust in the ram-jet. Air so compressed is heated by injection and combustion of fuel therein and its velocity is increased by venturi section 45 so that it is discharged at a higher velocity than that at which it entered the ram-jet. Accordingly, the ram-jet of my invention is capable of developing thrust below the high aircraft speeds presently required for developing thrust in known ram-jet engines. Once the aircraft has forward speeds of the order of 550 miles per hour or greater, the velocity of the air entering into the ram-jet is sufficiently high due to the speed of the aircraft alone and the ram-jet is capable of operation by itself, so that the turbo-jet can be turned off. When the turbo-jet is not in operation, the air inlet 12a may be closed so as to prevent free wheeling of the compressor.

Aside from the feature of ram-jet operation irrespective of the speed of the aircraft, the power plant of the invention is a compact assembly which can be mounted in an aircraft fuselage in the same manner as a conventional turbo-jet engine. No additional mounts are necessary. While the combination power plant will have a slightly larger diameter than that of a conventional turbo-jet, the weight of my power plant will be lower and such weight difference will compensate for the enlarged diameter. The power plant of my invention also has a lower slenderness ratio, that is, the ratio of shaft length to shaft diameter, than that of the shaft of a conventional turbo-jet engine so that the flexure of my shaft will be lower than that of the shaft of the latter-type engine. Furthermore, the air passing through the forward portion of the ram-jet duct 39 will cool the bearings 34, 34a and 34b.

When the ram-jet is not in operation, covers 51 may be moved to closed position or, alternately, air inlet 50 may be kept open. If the inlet is open, air will pass through the ram-jet duct and will cool the gas turbine assembly. In the event that afterburners are used in the exhaust nozzle 28 of the turbo-jet, the open duct is an available source of large quantities of air for the afterburner.

The terms and expressions which I have employed are used in a descriptive and not a limiting sense, and I have no intention of excluding such equivalents of the invention described, or of portions thereof, as fall within the purview of the claims.

I claim:

1. A ram-jet aircraft power plant comprising in combination, a ram-jet duct including a rotatable tubular member, and a turbo-jet assembly mounted about said duct and including a compressor rotor carried by said rotatable tubular member, a burner, a turbine rotor carried by said rotatable tubular member and driving said compressor rotor, and a jet nozzle surrounding the discharge end of the ram-jet duct so as to effect a suction for drawing air into the front end of said duct.

2. A ram-jet aircraft power plant comprising in combination, a segmental, tubular ram-jet duct including a fixed forward segment, a fixed rear segment, and a rotatable intermediate segment, and a turbo-jet assembly mounted about said duct and including a compressor rotor carried by said rotatable segment, a burner, a turbine rotor carried by said rotatable segment and driving said compressor rotor, and a jet nozzle surrounding the discharge end of the ram-jet duct so as to effect a suction for drawing air into the front end of said duct, the rear portion of said duct having a decreasing cross-section followed by a gradually increasing cross-section.

3. A ram-jet aircraft power plant comprising in combination, a segmental, tubular ram-jet duct including a fixed forward segment, a fixed rear segment, and a rotatable intermediate segment having a combustion chamber therein, a fuel injector disposed centrally in said chamber, and a support secured to said fixed rear segment for mounting said fuel injector, and a turbo-jet assembly mounted about said duct and including a compressor rotor carried by said rotatable segment, a burner, a turbine rotor carried by said rotatable segment and driving said compressor rotor, and a jet nozzle surrounding the discharge end of the ram-jet duct so as to effect a suction for drawing air into the front end of said duct, the rear portion of said duct having a decreasing cross-section followed by a gradually increasing cross-section.

4. A ram-jet aircraft power plant comprising a tubular duct forming an inner, substantially rectilinear flow path for motive fluid, said duct including a forward ram section normally open to the atmosphere, a rear discharge section, and an intermediate combustion section, means surrounding said duct and forming an outer, annular flow path for motive fluid, said means including in tandem a compressor rotor mounted around said duct, a burner, a turbine rotor mounted around said duct in driving relation to said compressor rotor, and a nozzle for discharging exhaust gases from said turbine in the form of a jet, said nozzle being concentric with and surrounding the discharge end of said discharge section so as to effect a suction for drawing air into the normally open front end of said duct.

5. A ram-jet aircraft power plant comprising in combination, a tubular duct forming a flow path for motive fluid, said duct having a forward ram section normally open to the atmosphere, a rear discharge section, and an intermediate combustion section, part of said duct being rotatable, a gas turbine jet propulsion assembly around said duct and forming a second, annular flow path for motive fluid concentric with said duct, said assembly including a compressor mounted on the outer periphery of the rotatable part of the duct for rotation therewith, a burner, a turbine fixedly mounted on the outer periphery of the rotatable part of the duct in driving relation to said compressor, and a nozzle for discharging combustion gases from said turbine in the form of a jet, said nozzle being concentric with and surrounding the outlet of the rear discharge section so as to effect a suction for drawing air into the front end of said tubular duct.

6. A ram-ject aircraft power plant comprising in combination, a tubular duct forming a flow path for motive fluid, said duct having a forward ram section normally open to the atmosphere, a rear discharge section, and an intermediate combustion section, part of said duct being rotatable, a gas turbine jet propulsion assembly around said duct and forming a second, annular flow path for motive fluid concentric with said duct, said assembly including a compressor mounted on the outer periphery of the rotatable part of the duct for rotation therewith, a burner, a turbine fixedly mounted on the outer periphery of the rotatable part of the duct in driving relation to said compressor, and a nozzle for discharging combustion gases from said turbine in the form of a jet, said nozzle being concentric with and surrounding the outlet of the rear discharge section so as to effect a suction for drawing air into the front end of said tubular duct, and closure means selectively movable to and from a position closing the forward ram section of said duct to the atmosphere so as to prevent air from entering the duct.

7. A ram-jet aircraft power plant comprising in combination, a tubular duct forming a flow path for motive fluid, said duct having a forward ram section normally open to the atmosphere, a rear discharge section, and an intermediate combustion section, part of said duct being rotatable, a gas turbine jet propulsion assembly around said duct and forming a second, annular flow path for motive fluid concentric with said duct, said assembly including a compressor mounted on the outer periphery of the rotatable part of the duct for rotation therewith, a burner, a turbine fixedly mounted on the outer periphery of the rotatable part of the duct in driving relation to said compressor, and a nozzle for discharging combustion gases from said turbine in the form of a jet, said nozzle being concentric with and surrounding the outlet of the rear discharge section so as to effect a suction for drawing air into the front end of said tubular duct, movable closure means in said forward ram section of said duct, and power-operated means connected with said closure means for moving said means to and from a position closing the ram section to the atmosphere so as to prevent air from entering the duct.

References Cited in the file of this patent

UNITED STATES PATENTS

| Number | Name | Date |
| --- | --- | --- |
| 2,379,541 | Planiol | July 3, 1945 |
| 2,482,505 | Pierce | Sept. 20, 1949 |
| 2,596,435 | Robert | May 13, 1952 |
| 2,610,465 | Imbert et al. | Sept. 16, 1952 |
| 2,626,501 | Pavlecka et al. | Jan. 27, 1953 |

FOREIGN PATENTS

| Number | Country | Date |
| --- | --- | --- |
| 622,181 | Great Britain | Apr. 27, 1949 |